United States Patent [19]

Steigerwald et al.

[11] Patent Number: 4,694,384

[45] Date of Patent: Sep. 15, 1987

[54] HVIC POWER SUPPLY CONTROLLER WITH PRIMARY-SIDE EDGE DETECTOR

[75] Inventors: Robert L. Steigerwald, Scotia, N.Y.; Kevin C. Routh, Durham, N.C.; Glenn S. Claydon, Wynantskill; William H. Bicknell, Ballston Lake, both of N.Y.

[73] Assignee: General Electric Company, Schenectady, N.Y.

[21] Appl. No.: 938,089

[22] Filed: Dec. 4, 1986

[51] Int. Cl.$^4$ .................... G05F 1/56; H02M 3/335
[52] U.S. Cl. .................................. 363/17; 363/41; 363/98
[58] Field of Search ................ 363/17, 41, 49, 98, 363/124, 132; 323/901

[56] References Cited

U.S. PATENT DOCUMENTS

| | | | |
|---|---|---|---|
| 4,455,526 | 6/1984 | Miller | 363/86 X |
| 4,458,194 | 7/1984 | Geppert et al. | 363/41 X |
| 4,502,105 | 2/1985 | Jessee | 363/41 |
| 4,574,342 | 3/1986 | Runyan | 363/134 |
| 4,617,622 | 10/1986 | Fox | 363/98 |
| 4,644,240 | 2/1987 | Horie et al. | 363/96 X |

Primary Examiner—Peter S. Wong
Attorney, Agent, or Firm—Geoffrey H. Krauss; James C. Davis, Jr.; Marvin Snyder

[57] ABSTRACT

A digital data detector is part of the primary side control electronics in a high voltage integrated circuit for regulating a power supply secondary side output potential; the detector output is responsive to the transitions of digital error data received from the supply secondary side via an electrically-isolated data transmission means. Only the transition edges are utilized by the detector, so that any non-linearity after each transition of the transmission means is immaterial. If the isolation device is a pulse transformer, the transformer core can be of relatively small volume, as full-pulse reproduction is unimportant and pulse saturation is tolerable. A multiplexer allows the primary side control electronics to initiate power supply operation; control is switched to the secondary side responsive to signal edges therefrom being detected by the digital data detector.

21 Claims, 1 Drawing Figure

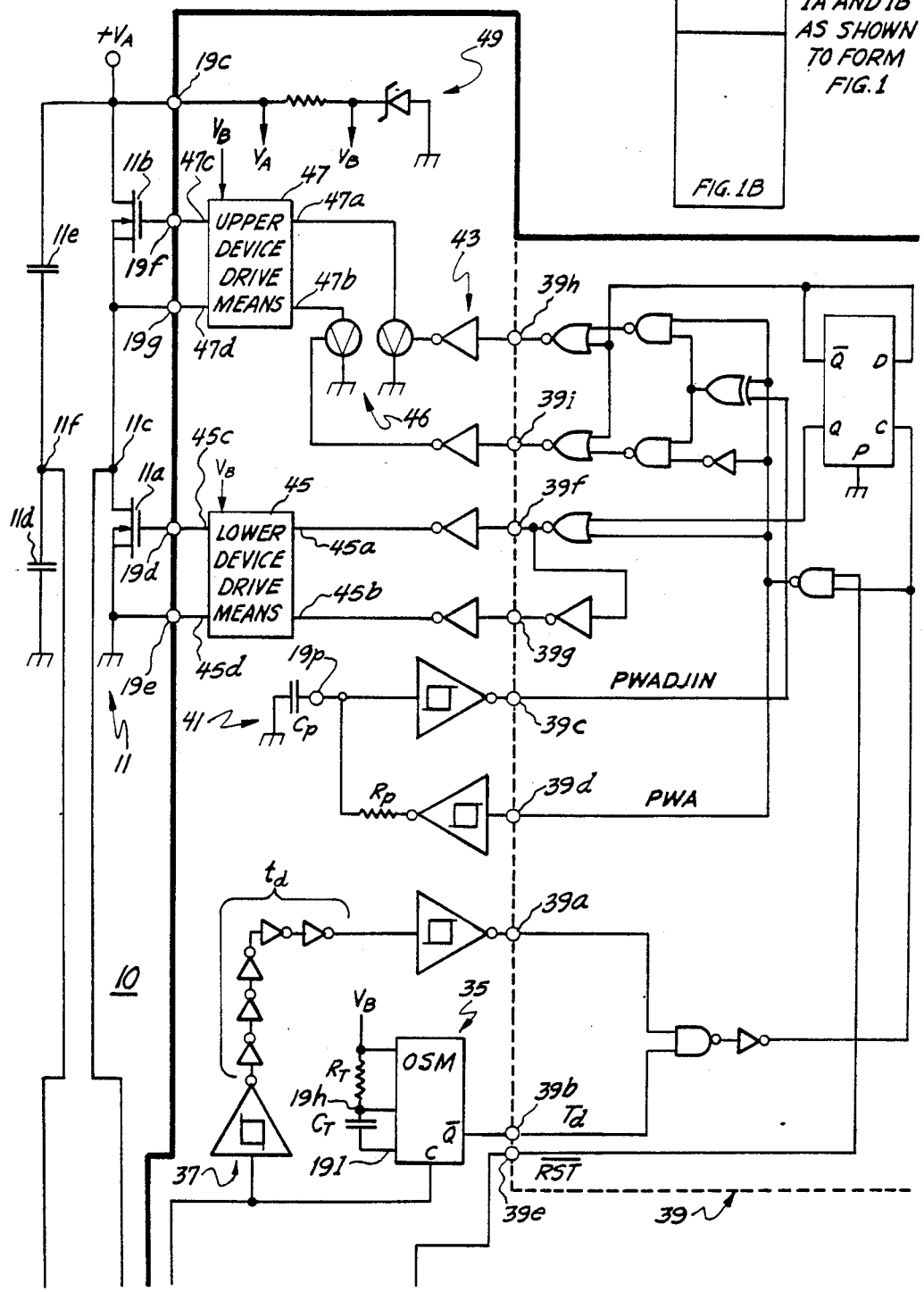

HVIC POWER SUPPLY CONTROLLER WITH PRIMARY-SIDE EDGE DETECTOR

The present invention relates to power supplies and, more particularly, to an edge detector for a high-voltage integrated circuit (HVIC) located on the primary side of a power supply switching transformer and receiving driving signals in digital format, via an isolation device, from a second IC on the secondary side of the supply.

It is well known that a power supply may receive a first DC potential, perhaps obtained by rectification and filtering of an AC powerline signal, and convert the DC potential into a high frequency AC signal for transformation to a different potential, which is itself rectified and filtered to realize a supply output DC potential. This essentially DC-to-DC-conversion power supply is usually characterized as having a primary side (including the potential transformer primary winding, the converter means which changes the incoming DC potential to a signal with a time-varying amplitude driving that primary winding, and all electronics controlling the converter means responsive to feedback from the output) and a secondary side (including the transformer secondary winding, the means for converting the AC potential across that winding to the output DC voltage(s) and means for comparing at least one output voltage against a reference potential, to derive a error signal which can be fed back to the primary side electronics for control of the output voltage amplitude). Some means must be provided to communicate the error information from the secondary side to the primary side of the power supply, while maintaining the two sides in electrical (ohmic) isolation. Because of the difficulties encountered in transferring analog error data across the isolation barrier, it is highly desirable to provide isolated digital communications between the secondary side and the primary side of the supply. A reduction in the size and cost of the isolative means and a decrease in the dependence of communication upon uniformity of isolation means responsive over the entire time interval for transmission of each bit of information, are also desirable.

BRIEF SUMMARY OF THE INVENTION

In accordance with the invention, a digital data detector is part of the primary side control electronics in a high voltage integrated circuit for regulating a power supply secondary side output potential; the detector output is responsive to the transitions of digital error data received from the supply secondary side via an electrically-isolated data transmission means. Thus, any saturation after each transition of the transmission means is immaterial, as only the occurrence of each transmission edge, if of at least a minimum magnitude, is utilized by the detector. The primary side control electronics initiate supply operation and switch to secondary side control only when error data is detected.

In a presently preferred embodiment, the isolation device is a pulse transformer; the transformer core can be of relatively small volume, as full-pulse reproduction is unimportant and pulse saturation is tolerable.

Accordingly, it is an object of the present invention to provide a novel HVIC power supply primary side controller, with a pulse edge detector.

This and other objects of the present invention will become apparent to those skilled in the art upon consideration of the following detailed description, when read in conjunction with the drawing.

BRIEF DESCRIPTION OF THE DRAWING

The sole FIGURE is a schematic diagram of a power supply utilizing a presently preferred embodiment of our invention.

DETAILED DESCRIPTION OF THE PREFERRED EMBODIMENT

Figure 1B:
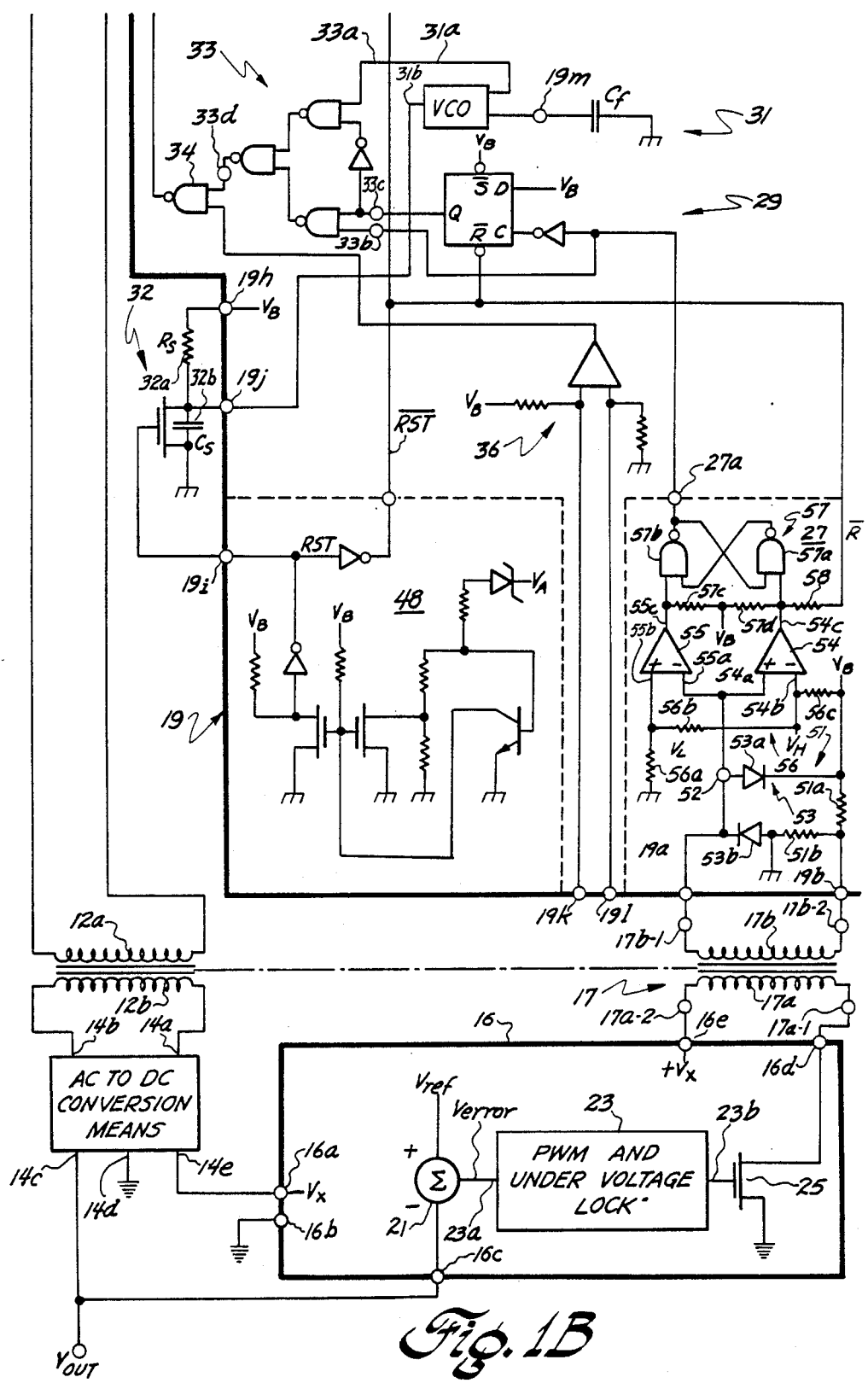

Referring to the sole FIGURE, a power supply 10 utilizes a primary-side chopping means 11, such as a half-bridge configuration of series-connected power switching devices (e.g. FETs) 11a and 11b, with a node 11c therebetween, and a pair of storage elements (e.g. capacitors) 11d and 11e, with a node 11f therebetween. The chopping means operates from a relatively high amplitude D.C. potential $+V_A$ (which can be obtained in known manner by rectification and filtering of a line AC voltage) and provides a signal to drive a primary winding 12a, connected between nodes 11c and 11f, of a high frequency transformer means 12. The primary winding driving waveform may have a frequency of up to about 1 MHz. and may have a waveform which can be substantially sinusoidal, for a resonant inverter power supply, or can be substantially rectangular with variable duty cycle, for a pulse-width-modulated (PWM) power supply. The transformer secondary winding 12b is connected to first and second input terminals 14a and 14b of an AC-to-DC conversion means 14, for providing an output voltage $V_{out}$ of a desired substantially constant magnitude at an output 14c, with respect to a secondary side common connection 14d. Means 14 preferably also provides a second voltage (e.g. an operating potential $V_x$) at a second output 14e, with respect to common potential 14d, for connection to an operating potential input 16a of a secondary-side integrated circuit means 16.

Integrated circuit means 16 has a terminal 16b for connection of the secondary side common potential and has an input terminal 16c for connection of the $V_{out}$ potential, for comparison in a summing means 21 against a reference voltage $V_{ref}$ (provided by unshown, but well known, means). The difference, or error, signal $V_{error}$ voltage is provided to the input 23a of a PWM generator/undervoltage lockout means 23. Means 23, itself well known in the art, provides a signal of pulsating nature at an output 23b, if the chip power supply voltage at 16a is greater than the lockout amplitude. The pulse output signal is a binary-level signal, having a frequency and/or pulse width set responsive to the magnitude and polarity of the error voltage signal present at means input 23a. The signal of output 23b is supplied to the gate of a field-effect transistor (FET) switching device 25, to control the signal between the primary terminals 17a-1 and 17a-2 (respectively connected to other terminals 16d and 16e, respectively, of integrated circuit means 16) of an isolation means 17.

Means 17 provides for signal transfer, in ohmically-isolated fashion, to a primary side HVIC 19 having data signal inputs 19a and 19b connected to the isolation means secondary terminal 17b-1, with respect to terminal 17b-2. Isolation means 17 can be an optoisolator, in which a light-emitting diode is operatively connected between primary terminal 17a-1 and 17a-2, with the controlled-current-conduction circuit of a phototransistor and the like connected between secondary terminal 17b-1 and 17b-2, or can be (among other isolation devices) a small pulse transformer, as shown. The pulse transformer has a primary winding 17a connected between primary side terminals 17a-1 and 17a-2, and has a secondary winding 17b connected between secondary terminal 17b-1 and 17b-2. The isolation means 17 primary terminals 17a-1 and 17a-2 are connected between a potential ($+V_x$) source, at terminal 16e and the controlled conduction circuit of FET 25; responsive to each pulse of current caused to flow through primary winding 17a, a signal voltage appears between secondary terminals 17b-1 and 17b-2 and therefore between HVIC input terminals 19a and 19b.

In accordance with one principle of the present invention, connected to input terminals 19a and 19b is a pulse edge detection circuit means 27 for detecting the digital data signal edge transitions which appear at the ohmic isolation means secondary terminal 17b-1 and 17b-2, even if the remainder of each data pulse causes isolation means 17 to become saturated. Thus, even if isolation means 17 saturates immediately after transmitting "turn-off" or "turn-on" edge signals across the isolation barrier between primary and secondary side of the supply, pulse detector circuit 27 will still recognize the positive-going and negative-going edge, or impulse, voltage present immediately prior to saturation; this recognition results in the signal at an output 27a being provided at that one of binary signal conditions related to the state of the last edge transition detected. Therefore, because only the pulse edges are utilized, the pulse transformer (or other isolation means selected) does not have to be capable of remaining unsaturated for the longest pulsewidth generated by the secondary side electronics and can be relatively small.

The binary pulse-level condition signal at pulse edge, or transition, detector output 27a is, when present, applied to an input of a start-run means 29, which changes supply operation from a "soft-start" mode (controlled by means, described hereinbelow, on the primary side) to a "full-run" mode (controlled by the secondary side) only if detector 27 output pulses are present. Thus, before the error-data pulses commence, at the start of supply operation, or when the pulses stop for any reason, means 29 will be reset to again cause the primary side electronics to be in control, to again soft-start the supply.

The limit of the signal frequency at an output 31a of a voltage-controlled oscillator (VCO) means 31 is set by a set capacitance $C_f$ connected to a HVIC terminal 19m, but the instantaneous frequency is set by the potential at a frequency-control input 31b and is responsive to a slow-start ramp means 32 (comprised of an active device 32a, a shunt capacitance 32b and a series resistive 32c, coupled to terminals 19h, 19i and 19j of the HVIC). In accordance with another principle of the invention, the variable-frequency VCO output signal is applied to one selectable input 33a of a multiplexing (MUX) means 33, while the pulse detector output signal is applied to the other selectable input 33b. A selection control input 33c receives the output of the start-run means 29 so that the MUX means output 33d signal is either the VCO means 31 output signal (generated on the primary side for start-up operation) or is the detector 27 output (from the secondary-side error output for control of the power supply output regulation) in normal "run" operation. The selection of primary side control or secondary side control is thus respectively responsive to the respective absence or presence of detected pulses at detector output 27a. The selected signal is applied to one input of a two-input combiner AND gate means 34, having its output connected to a clock C input of a one-shot multivibrator (OSM) means 35. The remaining input of gate 34 is provided at the output of a current-limit-sensing means 36, so that the gate 34 output signal is locked in a no-action logic zero condition if the current sensed by an element (not shown) between HVIC terminals 19k and 19l is sufficient to drive the sensing means output to a low, or limit-sensed, condition. The output of gate 34 is also provided to a delay means 37, in which a time delay $t_d$ is caused to occur to each binary level transition of the gate output signal, prior to the delayed signal being introduced to a PWM control input 39a of a pulse logic control portion 39. A second pulse logic control portion input 39b receives the Q output of OSM means 35; this output is at a low logic zero level, preventing action thereon, for some time interval (set by the resistance $R_T$ and capacitance $C_T$ values of the respective timing elements connected to HVIC terminals 19h, 19m and 19n) after each positive-going edge at the gate 34 output. The timing establishes a "dead" time, during which neither of devices 11a and 11b are conducting, to prevent both devices simultaneously conducting at any time.

A third pulse control portion input 39c receives a signal PWADJIN at the output of a pulse width adjustment means 41, responsive to a signal PWA provided at a first output 39d of the pulse logic control portion. Responsive to the inputs at terminals 39a, 39b, 39c and to the absence of a "not-reset" RST signal at a fourth input 39e, the pulse logic control portion 39 provides respective first driver "on" and "off" control signals at respective outputs 39f and 39g, and respective second driver on and off signals at outputs 39h and 39i, respectively. Buffer-inverter means 43 apply the first device condition signals directly to the respective inputs 45a and 45b of a lower device drive means 45, which receives an operating potential $+V_B$. The lower device means outputs 45c and 45d are respectively connected to HVIC terminals 19d and 19e for driving at least a portion (e.g. the lower FET 11a) of the primary side electronics means 11. Unlike the lower device drive means, which operates at the lower $V_B$ operating potential (e.g. 15 volts), the upper device drive means operates at the full $V_A$ unipolar high voltage potential (e.g. 380 volts and the like with respect to the primary side common potential at terminal 19e) so that the upper device drive means 47 must have each of its first input 47a and second input 47b controlled through an associated one of controlled-current source means 46, each operated by the associated one of the buffer-inverter means 43 output signals. The upper device drive means first output 47c provides a second drive signal (for another portion, e.g. the upper FET 11b, of the primary-side drive electronic means 11) to a HVIC terminal 19f (with respect to the upper device drive common terminal connected to HVIC terminal 19g). A slow-start control means 48 senses the initial application of operating potential to the HVIC, and provides a reset RST signal at HVIC terminal 19i for controlling the external ramping means 32 to provide the turn-on slow-start ramp signal at input 19j, responsive to the presence of $V_B$ operating potential at terminal 19h. This ramp signal is coupled to VCO means control input 31b (to decrease the frequency thereof to the normal operating frequency set by the control capacitance $C_f$ connected to terminal 19m ). The operating voltage $V_B$ is provided by a regulator means 49, receiving the primary-side potential $V_A$ at a terminal 19c.

In accordance with the invention, pulse edge detector means 27 comprises: means 51 (including a voltage divider formed of resistances 51a and 51b, connected between the $V_B$ source and common potential) for biasing a node 52 to a predetermined resting potential; means (including catching diodes 53a and 53b) for preventing the node 52 voltage from being either greater than the operating potential (diode 53a) or less than the common potential (diode 53b), responsive to at least pulse edge transitions introduced to node 52 by the isolation means 17 output signal; first and second comparator means 54 and 55 respectively for detecting if the node 52 signal is less than or greater than predetermined levels, to determine if a pulse falling edge or a pulse rising edge is being encountered; a network 56 (using a voltage divider formed of resistance 56a, 56b and 56c) series connected between $V_B$ source and conversion potential for providing the predetermined levels (e.g. high level $V_H$ and low level $V_L$, respectively greater than and less than the node 52 resting voltage) against which the comparator means 54/55 compare the biased isolation means output signal; and latch means 57 (using a pair of cross-coupled two-input NAND gates 57a and 57b and a pair of input pull-up resistances 57c and 57d) for holding the last detected-edge condition until the next detected edge condition is present with opposite polarity at the input node 52. An additional resistance 58 couples the reset-not (RST) signal to the normally-pulled-high input of gate 57a. The RST signal is at a low logic level only for a short time interval immediately after the initial application of operating potentials $V_A$ and $V_B$, as at commencement of operation of power supply 10. This low signal level at operation commencement serves to pull the first comparator output 54c/gate 57a input connection (to which pull-up resistor 57d and pull-down resistor 58 are also connected) to a low level at start-up, so that the output of gate 57a is at a high logic level, and latch means 57 is reset. Thus, the pulse edge detector output 27a is initially forced to a low logic level, so that the first positive-going transition of the signal at the isolation means output will cause comparator output 55c to change state and provide a positive-going transition at detector output 27a. As soon as the start-up ramp is complete and the low-level RST signal is removed from the R input of start-run means 29, the next detected negative-going pulse edge transition will set the means 29 Q output to a high logic level, replacing the start-up VCO means signal at MUX output 33d with the run PWM signal from the edge detected output 27a and allowing the feedback error data to control the chopper means 11 and, therefore, the voltage amplitude at output 14c.

While our present invention has been described with respect to one presently preferred embodiment thereof, many variations and modifications will now become apparent to those skilled in the art. It is our intent, therefore, to be limited only by the scope of the appended claims, and not by way of details and instrumentalities presented by way of description of one embodiment herein.

What we claim is:

1. A power supply for converting a first DC potential to a second DC potential of predetermined amplitude, comprising:

primary side means for receiving the first DC potential with respect to a primary side common potential;

chopper means for converting the first DC potential at the primary side receiving means to a chopped signal with a periodically varying amplitude;

a potential transformer having a primary winding, receiving from the chopper means the chopped signal with respect to said primary side common potential, and a secondary winding providing on a secondary side a secondary signal, with respect to a secondary side common potential which is isolated from said primary side common potential, with said secondary signal having an amplitude responsive to at least one characteristic of the chopped signal received by the primary winding;

means for converting the secondary signal to at least the second potential;

means for providing a sequential digital data signal indicative of the magnitude and polarity of the error of the actual second potential with respect to the predetermined second potential amplitude;

means for isolatively coupling the digital data signal from the secondary side to the primary side of the power supply; and means, including a digital data edge detector for recovering each data bit of the digital data signal, on the primary side, responsive substantially only to each edge transition thereof, for controlling the operational characteristics of said chopper means to vary the chopped signal in manner to reduce the error of said second DC potential.

2. The power supply of claim 1, wherein the edge detector comprises: input means for receiving the digital data signal; means for providing first and second reference levels; means for comparing the data signal then present at said input means against both reference levels and providing respective first or second output conditions as soon as the binary level of the input data is respectively less than the first reference level or greater than the second reference level; and means for latching that one of the comparing means output conditions as the edge detector output logic state, until another transition in comparing means output conditions occurs.

3. The power supply of claim 2, wherein said input means comprises: a node receiving the primary side digital data signal; and means for biasing the average level at said node to a value greater than said first reference level and less than said second reference level.

4. The power supply of claim 3, further comprising a source of operating potential for at least said detector; said biasing means comprising a potential divider, connected between the operating potential and the primary side common potential, to provide a biasing potential to said node at said average level.

5. The power supply of claim 4, wherein the isolatively coupling means is a pulse transformer having a first winding receiving the secondary side digital data signal and an output winding, said node being connected to a first end of the output winding, said potential divider supplying said average level biasing potential to a second output winding end.

6. The power supply of claim 3, wherein said detector further comprises means for preventing the magnitude of the signal at said node from exceeding a predetermined set of limit levels.

7. The power supply of claim 2, further comprising a source of operating potential for at least said detector; said reference level providing means comprises a potential divider, connected between the operating potential and the primary side common potential, to provide the first and second reference levels.

8. The power supply of claim 2, wherein said comparing means comprises first and second comparators each having an inverting input, a non-inverting input and an output; the inverting input of the first comparator and the non-inverting input of the second comparator being connected in parallel to receive the primary side digital data, with the non-inverting input of the first comparator receiving the first reference level potential and the inverting input of the second comparator receiving the second reference level potential; the first and second comparator outputs abruptly transitioning to respective high and low logic levels if the input data transitions from a starting value greater than the first reference level to an ending value less than the first reference level, and abruptly transitioning to respective low and high logic levels if the input data transitions from a starting value less than the second reference level to an ending value greater than the second reference level.

9. The power supply of claim 8, wherein said latching means comprises a set-reset flip-flop logic element, having respective set and reset inputs respectively connected to the first and second operational amplifier outputs.

10. The power supply of claim 9, wherein the flip-flop comprises: first and second two-input NAND gates, each having a first input cross-coupled to the output of the other, the remaining input of each different gate being coupled to a different one of the comparing means outputs; and first and second pull-up resistors, each coupled between operating potential and a different one of the operational amplifier outputs.

11. The power supply of claim 1, wherein the controlling means comprises: slow-start means for temporarily controlling the second DC potential amplitude whenever enabled; and multiplexer means for connecting the output of a respective one of the slow-start means and the edge detector to vary the chopped signal, responsive to the respective absence and presence of the detected edge transitions.

12. A binary data edge detector, comprising:
input means for receiving binary input data;
means for providing first and second reference levels;
means for comparing the data signal then present at said input means against both reference levels and providing respective first or second output conditions as soon as the binary input data is respectively less than the first reference level or greater than the second reference level; and
means for latching that one of the comparing means output conditions as the edge detector output logic state, until a transition in comparing means output condition occurs.

13. The edge detector of claim 12, further comprising means for biasing at least one of the comparing means and latching means to present a predetermined output logic state at commencement of operation.

14. The edge detector of claim 12, wherein said input means comprises: a node receiving the binary input data; and means for biasing the average level at said node to a value greater than said first reference level and less than said second reference level.

15. The edge detector of claim 14, wherein the detector is operated from a source of operating potential, and said biasing means includes a potential divider, connected between the operating potential and a detector common potential, to provide a biasing potential to said node at said average level.

16. The edge detector of claim 15, wherein the binary input data appears as a signal voltage across an output winding of a pulse transformer, said node being located at a first end of the output winding and said potential divider supplying said average level biasing potential to another output winding end.

17. The edge detector of claim 14, further comprising means for preventing the magnitude of the signal at said node from exceeding a predetermined set of limit levels.

18. The edge detector of claim 12, wherein the detector is operated from a source of operating potential, and said reference level providing means comprises a potential divider, connected between the operating potential and a detector common potential, to provide the first and second reference levels.

19. The edge detector of claim 12, wherein said comparing means comprises first and second comparator, each having an inverting input, a non-inverting input and an output; the inverting input of the first comparator and the non-inverting input of the second comparator being connected in parallel to receive the input data, with the non-inverting input of the first comparator receiving the first reference level potential and the inverting input of the second comparator receiving the second reference level potential; the first and second comparator outputs abruptly transitioning to respective high and low logic levels if the input data transitions from a starting value greater than the first reference level to an ending value less than the first reference level, and abruptly transitioning to respective low and high logic levels if the input data transitions from a starting value less than the second reference level to an ending value greater than the second reference level.

20. The edge detector of claim 19, wherein said latching means comprises a set-reset flip-flop logic element, having respective set and reset inputs respectively connected to the first and second operational amplifier outputs.

21. The edge detector of claim 20, wherein the flip-flop comprises: first and second two-input NAND gates, each having a first input cross-coupled to the output of the other, the remaining input of each different gate being coupled to a different one of the comparing means outputs; and first and second pull-up resistors, each coupled between operating potential and a different one of the operational amplifier outputs.

* * * * *